United States Patent
Hara et al.

(10) Patent No.: US 9,066,349 B2
(45) Date of Patent: Jun. 23, 2015

(54) WIRELESS COMMUNICATION DEVICE, WIRELESS COMMUNICATION METHOD AND COMMUNICATION CONTROL PROGRAM

(75) Inventors: Yasushi Hara, Kawasaki (JP); Katsumi Otsuka, Kawasaki (JP); Ryosuke Oishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 13/299,876

(22) Filed: Nov. 18, 2011

(65) Prior Publication Data

US 2012/0184323 A1    Jul. 19, 2012

(30) Foreign Application Priority Data

Jan. 19, 2011   (JP) .................................. 2011-008758

(51) Int. Cl.
| | |
|---|---|
| H04W 36/00 | (2009.01) |
| H04M 1/00 | (2006.01) |
| H04W 24/00 | (2009.01) |
| H04W 76/04 | (2009.01) |
| H04W 88/06 | (2009.01) |

(52) U.S. Cl.
CPC ............ *H04W 76/048* (2013.01); *H04W 88/06* (2013.01)

(58) Field of Classification Search
CPC ...................................................... H04Q 28/18
USPC .................................... 455/552.1, 574, 550.1
See application file for complete search history.

(56) References Cited

U.S. PATENT DOCUMENTS

| | | | | |
|---|---|---|---|---|
| 6,889,055 | B1 * | 5/2005 | Neufeld .......................... | 455/458 |
| 6,914,887 | B2 * | 7/2005 | Idsinga .......................... | 370/255 |
| 8,233,875 | B2 * | 7/2012 | Kalhan .......................... | 455/338 |
| 8,406,772 | B2 * | 3/2013 | Olson ............................ | 455/440 |
| 8,429,674 | B2 * | 4/2013 | Maeckel et al. ............... | 719/318 |
| 8,552,789 | B2 * | 10/2013 | Kalhan .......................... | 327/338 |
| 2002/0038369 | A1 * | 3/2002 | Sung et al. .................... | 709/227 |
| 2005/0111036 | A1 * | 5/2005 | Takasaki et al. .............. | 358/1.15 |
| 2008/0254841 | A1 * | 10/2008 | Miyata .......................... | 455/574 |

FOREIGN PATENT DOCUMENTS

| | | |
|---|---|---|
| JP | 2008-011452 | 1/2008 |
| JP | 2008-263520 | 10/2008 |
| JP | 2009-118160 | 5/2009 |
| JP | 2010-161754 | 7/2010 |

OTHER PUBLICATIONS

Japanese Notification of Reason for Refusal dated Feb. 18, 2014 in Japanese Patent Application No. 2011-008758.

* cited by examiner

*Primary Examiner* — Tilahun B Gesesse
(74) *Attorney, Agent, or Firm* — Staas & Halsey LLP

(57) ABSTRACT

A wireless communication device includes: a first wireless communication unit configured to receive a beacon signal when the first wireless communication unit is connected to a first wireless communication network; a second wireless communication unit configured to perform data communication through a second wireless communication network when the first wireless communication unit is not connected to the first wireless communication network; and a control unit configured to detect, from a signal from the first wireless communication network, a parameter concerning intervals at which the first wireless communication unit receives the beacon signal, and configured to perform control, based on the detected parameter, as to whether or not to disconnect connection to the first wireless communication network.

6 Claims, 13 Drawing Sheets

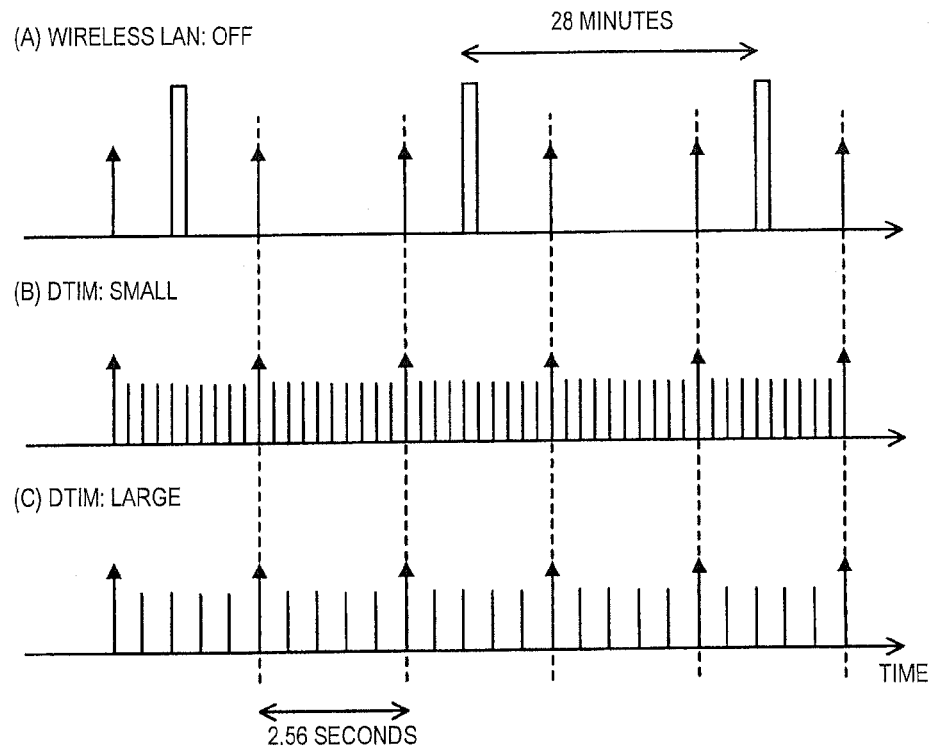
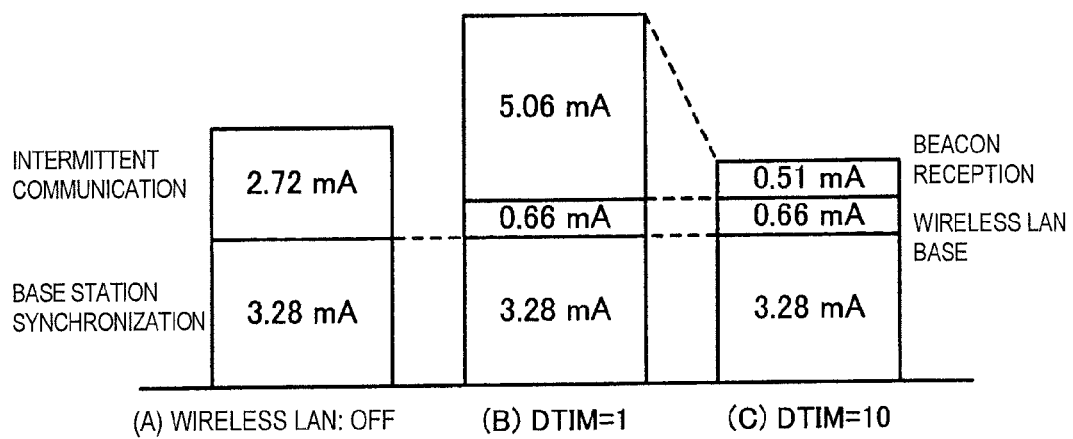

| DAY OF WEEK | TIME PERIOD | AVERAGE DURATION | DURATION #1 | ... | DURATION #10 |
|---|---|---|---|---|---|
| MONDAY | 6:00-9:00 | 24 MINUTES | 34 MINUTES | | 160 MINUTES |
| MONDAY | 9:00-12:00 | 60 MINUTES | 34 MINUTES | | 160 MINUTES |
| ⋮ | | | | | |
| SUNDAY | 18:00-24:00 | 120 MINUTES | 34 MINUTES | | 160 MINUTES |

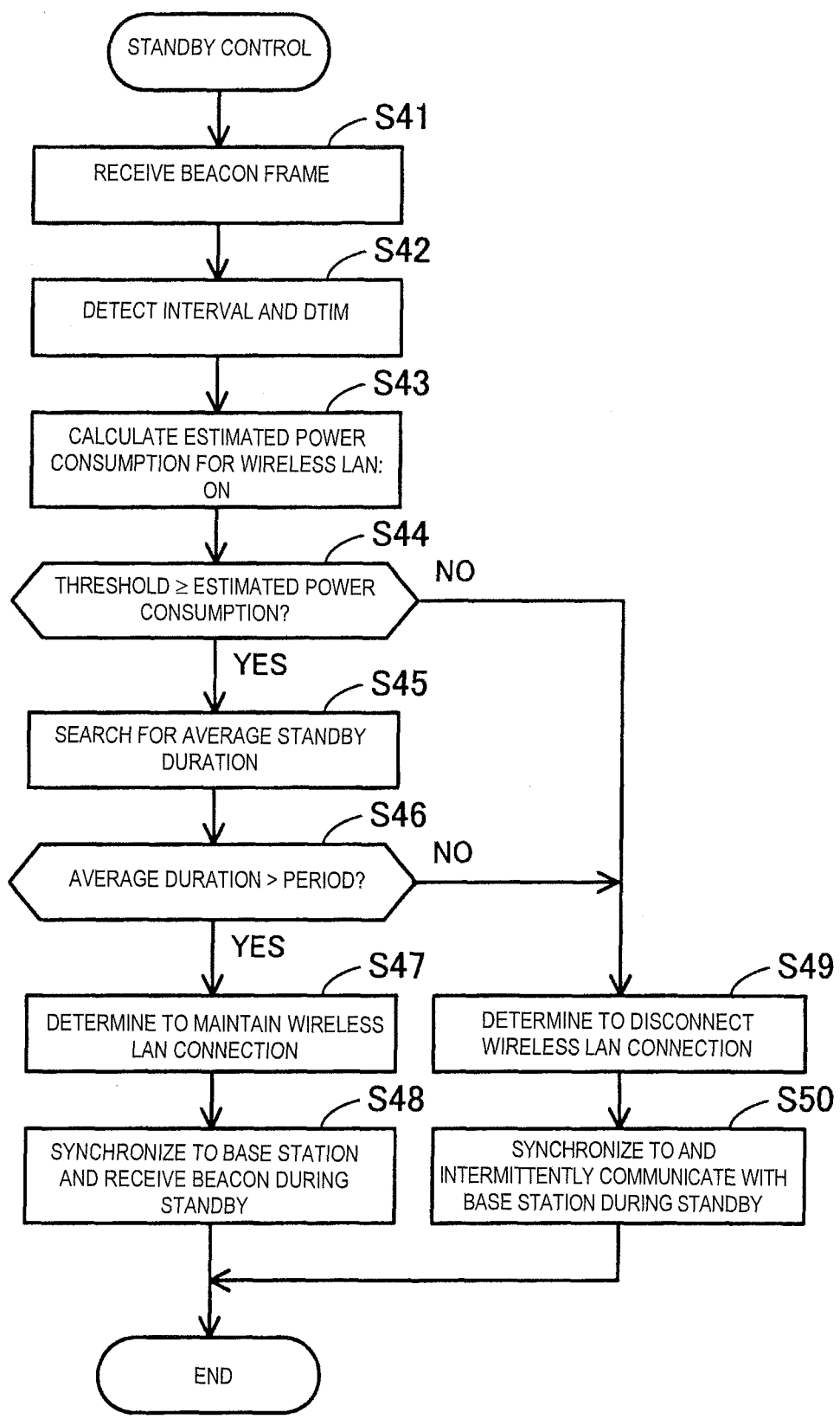

WIRELESS COMMUNICATION DEVICE, WIRELESS COMMUNICATION METHOD AND COMMUNICATION CONTROL PROGRAM

CROSS REFERENCE TO RELATED APPLICATION

This application is based upon and claims the benefit of priority from the prior Japanese Patent Application NO, 2011-008758 filed on Jan. 19, 2011, the entire contents of which are incorporated herein by reference.

FIELD

The embodiments disclosed hereafter are related to a wireless communication device, a wireless communication method, and a communication control program.

BACKGROUND

Wireless communication systems such as mobile phone systems and wireless local area networks (LANs) are widely used today. Some wireless communication devices are capable of using different types of wireless communication networks. For example, mobile phones are available that include two wireless communication units: one that connects to a mobile communication network to perform wireless communication and the other that connects to a wireless LAN to perform wireless communication. Such a wireless communication device allows a user to select a wireless communication network to use according to the location where the user is. Thus, the user may benefit from the advantages of different types of wireless communication networks. For example, in a place where a wireless LAN is available, the user may use the wireless LAN and use a mobile communication network in other places to benefit from advantages of the former, such as high speed communication, and from advantages of the latter, such as a wide communication area.

A mobile phone has been proposed that includes a mobile phone communication unit and a wireless LAN communication unit which are initialized to be placed in a standby mode or a sleep mode when they are powered so that the time requested for starting communication may be reduced (Japanese Laid-Open Patent Publication No. 2008-263520). A terminal device has been proposed that determines, on the basis of a power conservation parameter set at an access point, whether the terminal device is operating in a power saving mode or a non-power saving mode, and displays the determined mode on a display (Japanese Laid-Open Patent Publication No. 2009-118160).

Some wireless communication networks dynamically allocate an Internet Protocol (IP) address to a wireless communication device and, after no communication has been performed for a predetermined period of time, deallocate the IP address.

The wireless communication device may use a service in which the wireless communication device is informed about the presence of a message directed to the wireless communication device by the wireless communication network (a so-called push service) while the wireless communication device has an IP address allocated to it. Therefore the wireless communication device may operate so as to maintain the allocated IP address (for example communicates with the wireless communication network at regular intervals) even in a standby mode. However, there is the problem of how to cause the multiple wireless communication units of a wireless communication device that may use different types of wireless communication networks to operate so that power consumption may be effectively saved.

SUMMARY

There is provided a wireless communication device including first and second wireless communication units. When the first communication unit is connected to a first wireless communication network, the first communication unit constantly receives a beacon signal. The second wireless communication unit intermittently performs data communication through a second wireless communication network when the first wireless communication unit is not connected to the first communication network. The control unit detects from a signal on the first wireless communication network a parameter concerning the intervals at which the first wireless communication unit receives the beacon signal and, based on the detected parameter, determines whether or not to disconnect connection to the first wireless communication network.

There is also provided a wireless communication method for a wireless communication device including first and second wireless communication units. In the wireless communication method, a parameter concerning intervals at which a beacon signal is received is detected from a signal from a first wireless communication network. Based on the parameter, determination is made as to whether or not to disconnect connection to the first wireless communication network. If the connection to the first wireless communication network is to be maintained, the first wireless communication unit constantly receives the beacon signal; if the connection to the first wireless communication network is to be disconnected, the second wireless communication unit intermittently performs data communication through a second wireless communication network. Also provided is a communication control program for causing a computer to perform the wireless communication method.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIG. 6 is a diagram illustrating an example of wireless communication in a standby mode;

FIG. 7 is a diagram illustrating an example of power consumption in the standby mode;

FIG. 17 is a flowchart illustrating standby control according to the fourth embodiment.

DESCRIPTION OF THE PREFERRED EMBODIMENTS

Embodiments will be described with reference to drawings.

First Embodiment

Figure 1:
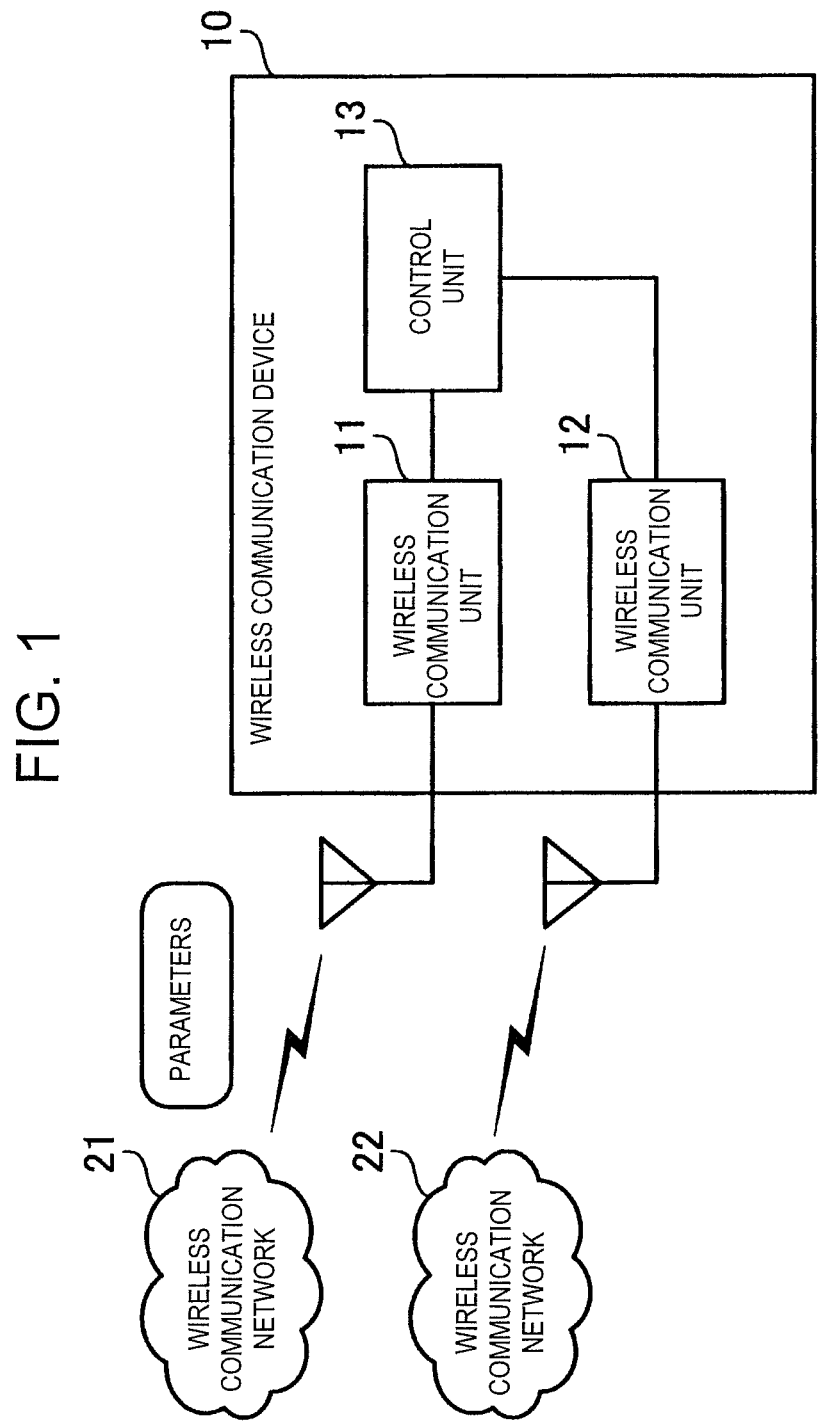
FIG. 1 is a diagram illustrating a wireless communication device according to a first embodiment.

FIG. 1 illustrates a wireless communication device according to a first embodiment. The wireless communication device 10 includes a wireless communication unit 11 (a first wireless communication unit), a wireless communication unit 12 (a second wireless communication unit) and a control unit 13.

The wireless communication unit 11 is capable of connecting to a wireless communication network 21 (a first wireless communication network) to perform wireless communication. The wireless communication network 21 may be a wireless LAN or a transmitter receiver, for example. Once connected to the wireless communication network 21, the wireless communication unit 11 constantly receives a beacon signal. For example, the wireless communication unit 11 periodically receives a beacon signal from an access point on the wireless communication network 21. The intervals at which the wireless communication unit 11 receives the beacon signal is determined on the basis of a parameter provided from the wireless communication network 21.

The wireless communication unit 12 is capable of connecting to a wireless communication network 22 (a second wireless communication network) to perform wireless communication. The wireless communication network 22 may be a mobile communication network, for example. When the wireless communication unit 11 is not connected to the wireless communication network 21, the wireless communication unit 12 intermittently performs data communication (this function is sometimes referred to as Always-ON) through the wireless communication network 22 while the wireless communication device 10 is in a standby mode. On the other hand, when the wireless communication unit 11 is connected to the wireless communication network 21, the wireless communication unit 12 does not perform intermittent data communication during the standby mode.

The control unit 13 detects a parameter concerning the intervals at which the beacon signal is received from a signal from the wireless communication network 21. Based on the detected parameter, the control unit 13 determines whether or not to disconnect connection to the wireless communication network 21 while the wireless communication device 10 is in the standby mode. If the connection to the wireless communication network 21 is maintained, the wireless communication unit 11 receives a beacon signal and the wireless communication unit 12 does not perform intermittent data communication. On the other hand, if the connection to the wireless communication network 21 is disconnected, the wireless communication unit 11 does not receive the beacon signal and the wireless communication unit 12 intermittently performs data communication. For example, if the intervals at which the wireless communication device 10 receives the beacon signal increases, the control unit 13 may determine to maintain the connection to the wireless communication network 21; if the intervals at which the wireless communication device 10 receives the beacon signal decreases, the control unit 13 may determine to disconnect the connection.

The present inventor has conducted product research and found a wireless communication device that intermittently performs data communication through a mobile communication network during standby mode when the device disconnects connection to a wireless LAN, and does not perform the Always-ON data communication when the device maintains the connection to the wireless LAN. For example, the wireless communication device may perform the Always-ON data communication to prevent an IP address allocated from the mobile communication network from being deallocated during standby mode. However, as long as an IP address allocated from the wireless LAN is maintained, the IP address allocated from the mobile communication network does not need to be maintained and therefore Always-ON data communication does not need to be performed. Therefore, the Always-ON function and retention of connection to the wireless LAN may be selectively applied.

The wireless communication device 10 described earlier detects the parameter concerning the intervals at which the beacon signal is received from a signal from the wireless communication network 21 and, based on the parameter, determines whether or not to disconnect connection to the wireless communication network 21. If connection to the wireless communication network 21 is maintained, the wireless communication unit 11 is controlled to constantly receive the beacon signal; if connection to the wireless communication network 21 is disconnected, the wireless communication unit 12 is controlled to intermittently perform data communication through the wireless communication network 22.

The wireless communication device 10 may select reception of the beacon signal by the wireless communication unit 11 or intermittent data communication by the wireless communication unit 12, whichever is more effective in saving power consumption during the standby mode. For example, when the intervals at which the beacon signal is received, which is determined based on a parameter set at an access point, is large, the wireless communication device 10 may determine that it is more effective for the wireless communication unit 11 to receive the beacon signal; when the intervals at which the beacon signal is received is small, the wireless communication device 10 may determine that it is more effective for the wireless communication unit 12 to intermittently perform data communication.

In the following description of second to fourth embodiments, an example of terminal device that is capable of using a wireless LAN and a mobile communication network such as a 3rd Generation (3G) network will be given for the purpose of illustration. However, the wireless communication networks 21 and 22 described with respect to the first embodiment are not limited to a wireless LAN and a mobile communication network.

Second Embodiment

Figure 2:
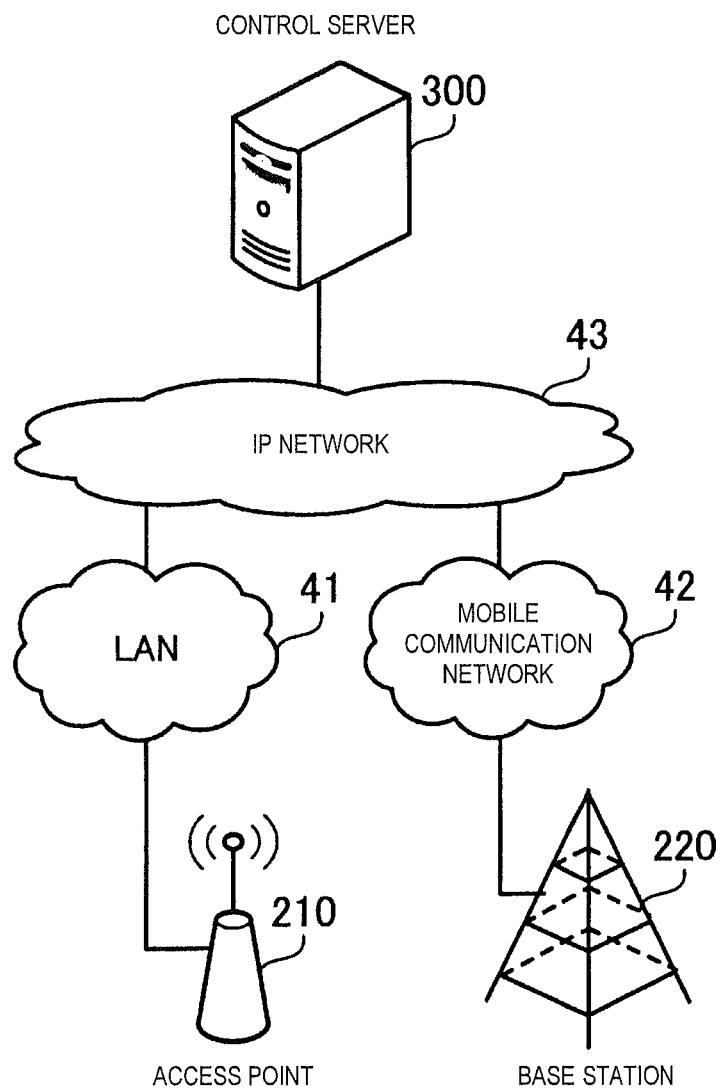
FIG. 2 is a diagram illustrating a wireless communication system according to a second embodiment.

FIG. 2 illustrates a wireless communication system of a second embodiment. The wireless communication system of the second embodiment includes a terminal device 100, an access point 210, a base station 220, a control server 300, a LAN 41, a mobile communication network 42, and an IP network 43.

The terminal device 100 is capable of using a wireless LAN and a mobile communication network 42 to perform wireless communication and may be a mobile phone or a personal digital assistant, for example. The terminal device 100 is an example of the wireless communication device 10 of the first embodiment. The terminal device 100 accesses an access point 210 to connect to the wireless LAN, and accesses a base station 220 to connect to the mobile communication network 42. In a standby mode during which application processing such as a telephone call or Web browsing is not being performed, the terminal device 100 operates in such a manner that power consumption is saved.

The access point 210 is a wireless communication device connected onto a wired LAN 41. The access point 210 wirelessly communicates with the terminal device 100 and transfers data between the terminal device 100 and the LAN 41. The access point 210 sends a beacon frame including preset parameters at regular intervals. When the terminal device 100 connects to the LAN 41, the LAN 41 allocates an IP address to the terminal device 100. The LAN 41 including the access point 210 is an example of the wireless communication network 21 of the first embodiment.

The base station 220 is a wireless communication device connected to a wired mobile communication network 42. The base station 220 wirelessly communicates with the terminal device 100 to transfer data between the terminal device 100 and the mobile communication network 42. When the terminal device 100 connects to the mobile communication network 42, the mobile communication network 42 allocates an IP address to the terminal device 100. However, after no data communication has been performed for a predetermined period of time, the base station 220 deallocates the IP address allocated to the terminal device 100. The mobile communication network 42 including the base station 220 is an example of the wireless communication network 22 of the first embodiment.

The control server 300 is a server computer connected to the LAN 41 and the mobile communication network 42 through the IP network 43. The control server 300 communicates with the terminal device 100 through the LAN 41 or the mobile communication network 42 to register the IP address allocated to the terminal device 100. The control server 300 uses the registered IP address to send a push message (for example an E-mail arrival alert) to the terminal device 100. The control server 300 also distributes a program for expanding the functionality of the terminal device 100. While the same server sends messages and distributes programs in the second embodiment, one server may send messages and another server may distribute programs.

Figure 3:
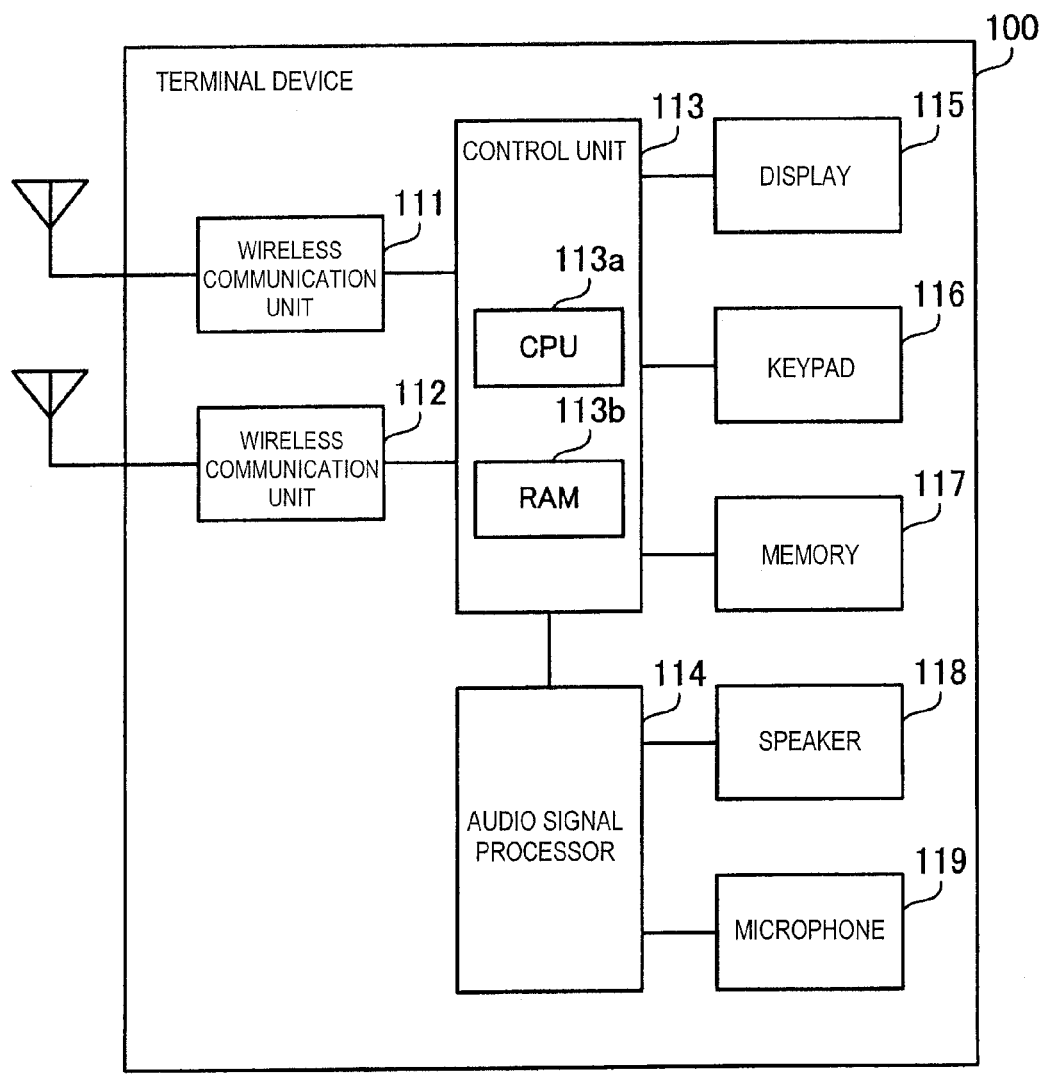
FIG. 3 is a block diagram illustrating a terminal device.

FIG. 3 is a block diagram illustrating a terminal device. The terminal device 100 includes wireless communication units 111 and 112, a control unit 113, an audio signal processor 114, a display 115, a keypad 116, a memory 117, a speaker 118 and a microphone 119.

The wireless communication unit 11 wirelessly communicates with the access point 210 according to specifications for the wireless LAN. The wireless communication unit 111 is an example of the wireless communication unit 11 of the first embodiment. The wireless communication unit 112 wirelessly communicates with the base station 220 according to specifications for mobile wireless communication. The wireless communication unit 112 is an example of the wireless communication unit 12 of the first embodiment. The wireless communication units 111 and 112 down-convert received signals, apply demodulation and error-correction decoding to the converted signals to extract data, and output the extracted data to the control unit 113. The wireless communication units 111 and 112 also apply error-correction coding and modulation to data obtained from the control unit 113, up-convert the data to radio signals, and outputs the radio signals through antennas.

The control unit 113 controls operations of the terminal device 100 such as wireless communication and image display operations. The control unit 113 is an example of the control unit 13 of the first embodiment. The control unit 113 includes a central processing unit (CPU) 113a and a random access memory (RAM) 113b. The CPU 113a reads a program and at least a part of data stored in the memory 117, loads them on the RAM 113b, and executes the program. The RAM 113b is a volatile memory which temporarily stores a program and data read by the CPU 113a. The control unit 113 halts execution of an application program during the standby mode.

The audio signal processor 114 performs audio signal processing under the control of the control unit 113. The audio signal processor 114 processes digital audio data obtained from the control unit 113 and outputs an audio signal to the speaker 118. The audio signal processor 114 also processes an audio signal obtained from the microphone 119, converts the audio signal to digital audio data, and outputs the digital audio data to the control unit 113.

The display 115 displays user-operation screens according to image signals obtained from the control unit 113. The display 115 may be a liquid-crystal display or an organic electroluminescence (EL) display, for example. The keypad 116 includes multiple input keys. When a user depresses any of the input keys, the keypad 116 outputs an input signal indicating the depressed input key to the control unit 113. The terminal device 100 may include a touch panel which detects a touch operation performed on the display 115.

The memory 117 is a nonvolatile memory which stores programs such as an operating system (OS) and application programs, and data used in processing by the control unit 113. The memory 117 may be a flash memory, for example. Programs stored in the memory 117 include a communication control program for controlling a wireless communication method during the standby mode. The control unit 113 may obtain a program distributed from the control server 300 and store the program in the memory 117 to expand the functionality of the terminal device 100.

The speaker 118 converts an electrical signal, which is an audio signal obtained from the audio signal processor 114, to physical vibration to reproduce sound. For example, when a user is in a telephone conversation, voice of the other party of the conversation and background noise are output from the speaker 118. The microphone 119 receives an audio input by converting physical sound vibration to an electrical signal and outputs the electrical signal, which is an audio signal, to the audio signal processor 114. For example, voice of the user and background noise are input through the microphone 119 while the user is in telephone conversation.

Figure 4:
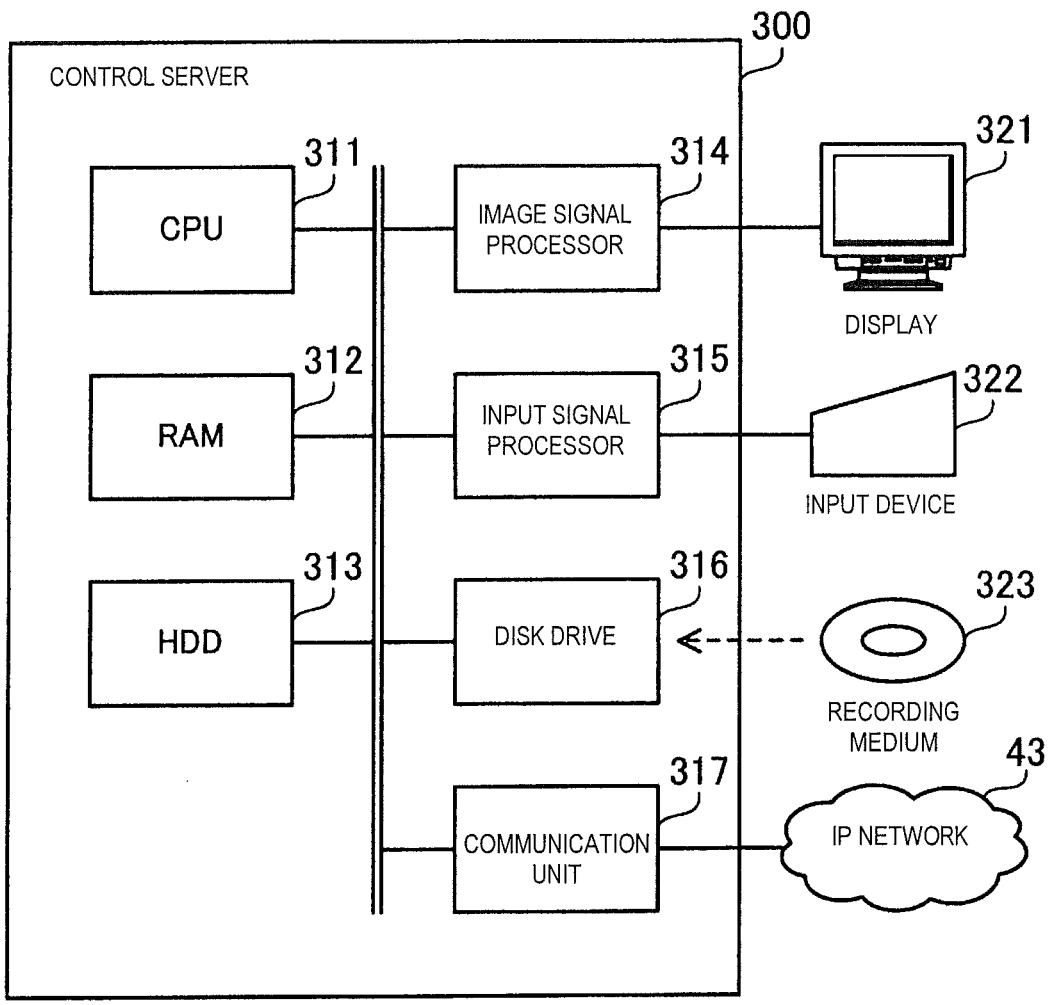
FIG. 4 is a block diagram illustrating a control server.

FIG. 4 is a block diagram illustrating a control server. The control server 300 includes a CPU 311, a RAM 312, a hard disk drive (HDD) 313, an image signal processor 314, an input signal processor 315, a disk drive 316 and a communication unit 317. These units are connected onto a bus within the control server 300.

The CPU 311 reads a program and at least a part of data stored in the HDD 313, loads them on the RAM 312 and executes the program. The RAM 312 is a volatile memory which temporarily stores a program and data read by the CPU 311. The HDD 313 stores programs such as OS and application programs, and data used in processing by the CPU 311. The HDD 313 reads and writes data on magnetic disks contained in the HDD 313. Nonvolatile memory devices of other types may be provided in the control server 300.

The image signal processor 314 causes a display 321 connected to the control server 300 to display user-operation screens according to instructions from the CPU 311. The display 321 may be a cathode ray tube (CRT) display or a liquid-crystal display, for example. The input signal processor 315 obtains an input signal from an input device 322 connected to the control server 300 and provides the input signal to the CPU 311. The input device 322 may be a pointing device such as a mouse, and a keyboard.

The disk drive 316 is a drive device that reads a program and data stored in a recording medium 323. The recording medium 323 may be a magnetic disk such as a flexible disk (FD), an optical disc such as a compact disk (CD) and a digital versatile disc (DVD), or a magneto-optical disk (MO), for example. The communication unit 317 connects to the IP network 43 to perform wired communication. For example, when the terminal device 100 is connected, the communication unit 317 communicates with the IP network 43 to obtain an IP address allocated to the terminal device 100. The communication unit 317 may perform communication while the terminal device 100 is in the standby mode.

A program to be executed by the terminal device 100 may be recorded on a recording medium 323. In that case, the disk drive 316 may read the program recoded on the recording medium 323 and store the program in the HDD 313. The control server 300 distributes a program stored in the HDD 313 to the terminal device 100, for example.

Figure 5:
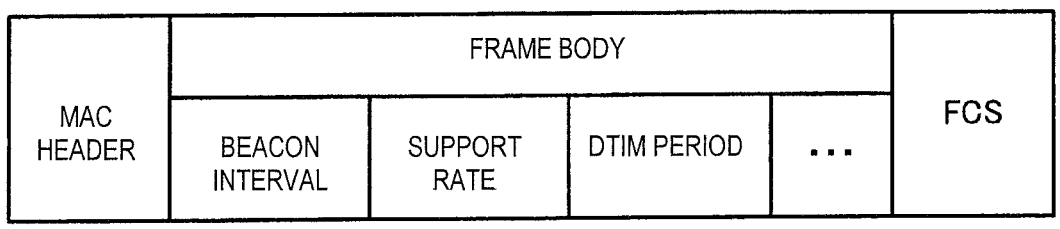
FIG. 5 is a diagram illustrating an exemplary structure of a beacon frame.

FIG. 5 illustrates an exemplary structure of a beacon frame. A beacon frame as the one illustrated in FIG. 5 is sent from the access point 210 at regular intervals (for example every 100 milliseconds). The beacon frame contains a media access control (MAC) header, a frame body and a frame check sequence (FCS). The MAC header is a header in a MAC layer that is added to a frame. The FCS is a check bit used for detecting an error in the frame.

The frame body contains values of parameters such as a beacon interval, a support rate, and a delivery traffic indication message (DTIM) period. The values of the parameters sent in the beacon frame are preset in the access point 210. The beacon interval indicates intervals at which a beacon frame is sent. The support rate indicates a transmission rate supported by the access point 210. The DTIM period indicates intervals at which at least a beacon frame, among beacon frames sent, that is to be received is received. For example, when the beacon interval is 100 milliseconds and the DTIM period is 10, the terminal device 100 receives a beacon frame at least at intervals of 100 milliseconds×10=1 second.

FIG. 6 illustrates an example of wireless communication in a standby mode. The terminal device 100 wirelessly communicates with the base station 220 at intervals of 2.56 seconds, for example, in order to maintain synchronization with the base station 220 during the standby mode in the wireless layer. In order to maintain an allocated IP address, the terminal device 100 maintains connection to the wireless LAN or intermittently performs data communication with the control server 300 through the mobile communication network 42 (Always-ON data communication).

For example, when the terminal device 100 has disconnected connection to the wireless LAN and halted operation of the wireless communication unit 111, the terminal device 100 performs data communication with the control server 300 through the mobile communication network 42 at intervals of 28 minutes ((a) in FIG. 6). On the other hand, when the terminal device 100 maintains connection to the wireless LAN, the terminal device 100 receives a beacon frame at intervals dependent on a parameter value provided from the access point 210. The parameter value may vary from access point to access point to which the terminal device 100 is connected ((B),(C) in FIG. 6).

FIG. 7 illustrates an example of power consumption in the standby mode. The terminal device 100 consumes 3.28 mA, for example, as base power for maintaining the standby mode and power for maintaining synchronization with the base station 220. The terminal device 100 also consumes power for receiving beacon frames or power for Always-ON data communication.

For example, when the terminal device 100 disconnects connection to the wireless LAN and performs Always-ON data communication, the terminal device 100 consumes 2.72 mA on average ((A) in FIG. 7). When the terminal device 100 maintains connection to the wireless LAN at beacon intervals of 100 milliseconds and a DTIM period of 1 (reception intervals of 100 milliseconds), the terminal device 100 consumes 0.66 mA as base power of the wireless communication unit 111 and a reception power of 5.06 mA ((B) in FIG. 7). When the terminal device 100 maintains connection to the wireless LAN at beacon intervals of 100 milliseconds and a DTIM period of 10 (reception intervals of 1 second), the terminal device 100 consumes 0.66 mA as base power of the wireless communication unit 111 and a reception power of 0.51 mA ((C) in FIG. 7).

As seen from the above, the standby method in which the terminal device 100 consumes less power depends on the parameter value sent from the access point 210. In the example in FIG. 7, when beacon interval=100 milliseconds and DTIM=1, less power is consumed while operation of the wireless communication unit 111 is halted. On the other hand, when beacon interval=100 milliseconds and DTIM=10, less power is consumed while the wireless communication unit 111 is kept operating.

Figure 8:
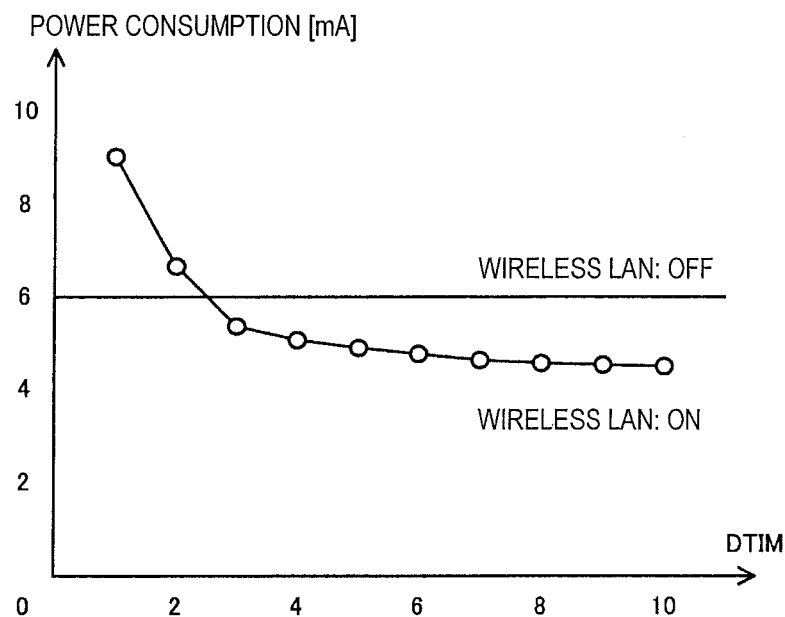
FIG. 8 is a graph of DTIM versus power consumption.

FIG. 8 is a graph of DTIM period versus power consumption. The horizontal axis of the graph of FIG. 8 represents DTIM period indicated by the access point 210 and the vertical axis represents average power consumption in the terminal device 100 in standby mode. The beacon interval is fixed at 100 milliseconds. Power consumption in the standby mode in which connection to the wireless LAN is maintained is inversely proportional to DTIM period. In the example in FIG. 8, when the DTIM period is 3 or greater, the power consumption is lower than the power consumption in the standby method in which Always-ON data communication is performed. On the other hand, when the DTIM period is smaller than or equal to 2, the power consumption is higher than the power consumption in the standby method in which Always-ON data communication is performed.

Control in the communication method in the terminal device 100 in standby mode will be described below. In the second embodiment, it is assumed that the beacon interval remains invariant (for example fixed at 100 milliseconds). Therefore, consideration will be primarily given to the DTIM period as the parameter for determining the intervals at which a beacon frame is received.

Figure 9:
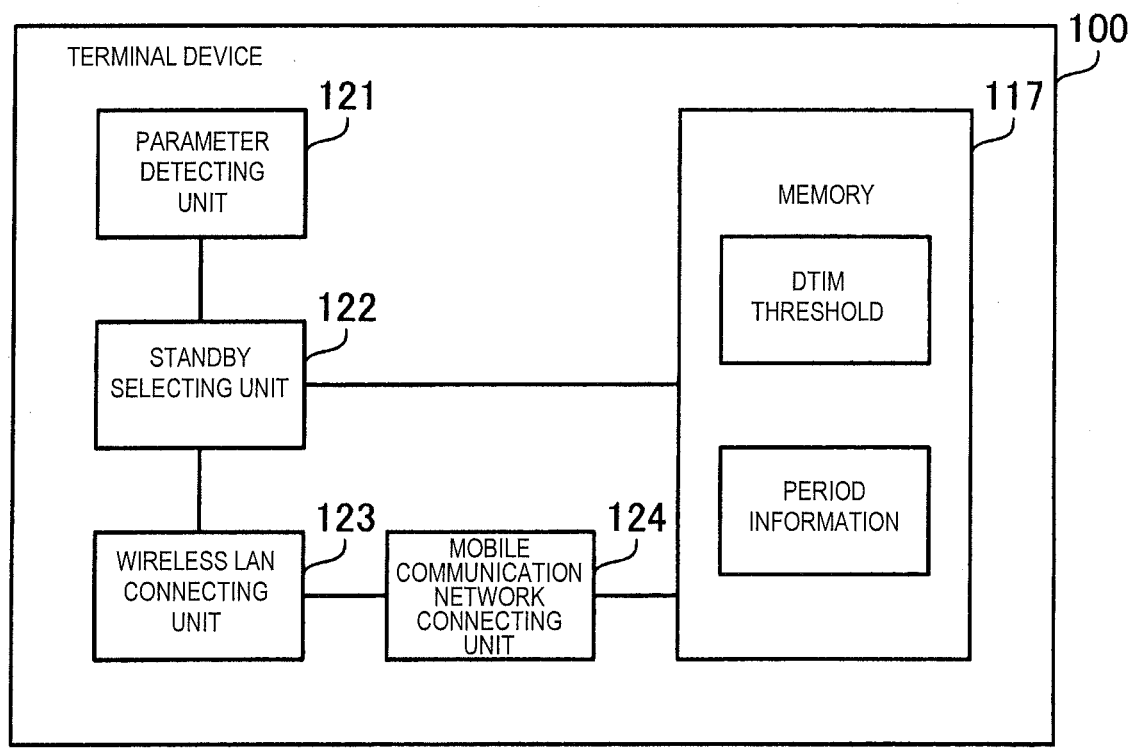
FIG. 9 is a block diagram illustrating functions of a terminal device according to the second embodiment.

FIG. 9 is a block diagram illustrating functions of a terminal device according to the second embodiment. A parameter detecting unit 121, a standby selecting unit 122, a wireless LAN connecting unit 123, and a mobile communication network connecting unit 124 are implemented in the terminal device 100 by the control unit 113 executing a program. The parameter detecting unit 121 and the standby selecting unit 122 may be implemented by the communication control program described above and the wireless LAN connecting unit 123 and the mobile communication network connecting unit 124 may be implemented by an OS program.

The parameter detecting unit 121 detects parameters contained in a beacon frame received by the wireless communication unit 111 when the terminal device 100 connects to the wireless LAN. In this way, the value of the DTIM period set at the access point 210 is detected.

The standby selecting unit 122 compares the value of the DTIM period detected by the parameter detecting unit 121 with a DTIM threshold stored beforehand in the memory 117. Based on the result of the comparison, the standby selecting unit 122 determines whether or not to disconnect connection to the wireless LAN when the terminal device 100 enters standby mode.

The wireless LAN connecting unit 123 controls operation of the wireless communication unit 111 according to the determination made by the standby selecting unit 122 when the control unit 113 halts execution of an application program and enters standby mode. When the connection to the wireless LAN is disconnected, the wireless LAN connecting unit 123 halts operation of the wireless communication unit 111 (for example, the wireless LAN connecting unit 123 halts power supply to the wireless communication unit 111).

When the control unit 113 enters standby mode, the mobile communication network connecting unit 124 controls operation of the wireless communication unit 112 according to whether or not the connection to the wireless LAN is maintained. When the connection to the wireless LAN is disconnected, the mobile communication network connecting unit 124 controls the wireless communication unit 112 to perform Always-ON data communication at intervals (for example 28 minutes) indicted by interval information stored beforehand in the memory 117.

The DTIM threshold stored in the memory 117 may be calculated by a computer other than the terminal device 100 prior to shipment of the terminal device 100 or prior to distribution of the communication control program. The DTIM threshold may be calculated as follows, for example.

First, average power consumption $I_{OFF}$ of the terminal device 100 during Always-ON data communication is calculated according to Equation (1).

[Equation 1]

$$I_{OFF}=Ia \times ta/T \qquad (1)$$

where Ia is power consumption during Always-ON data communication, to is the duration of data communication performed at a time, and T is intervals (for example 28 minutes). In the example in FIG. 7, $I_{OFF}$ is 6 mA.

Then, the value of the DTIM period is increased from 1 and power consumed in the terminal device 100 while receiving beacon frames is measured. For example, power consumption as plotted in FIG. 8 is measured. Then, the minimum DTIM period that yields power consumption less than $I_{OFF}$ is set as the DTIM threshold. In the example in FIG. 8, the DTIM threshold is 3.

Figure 10:
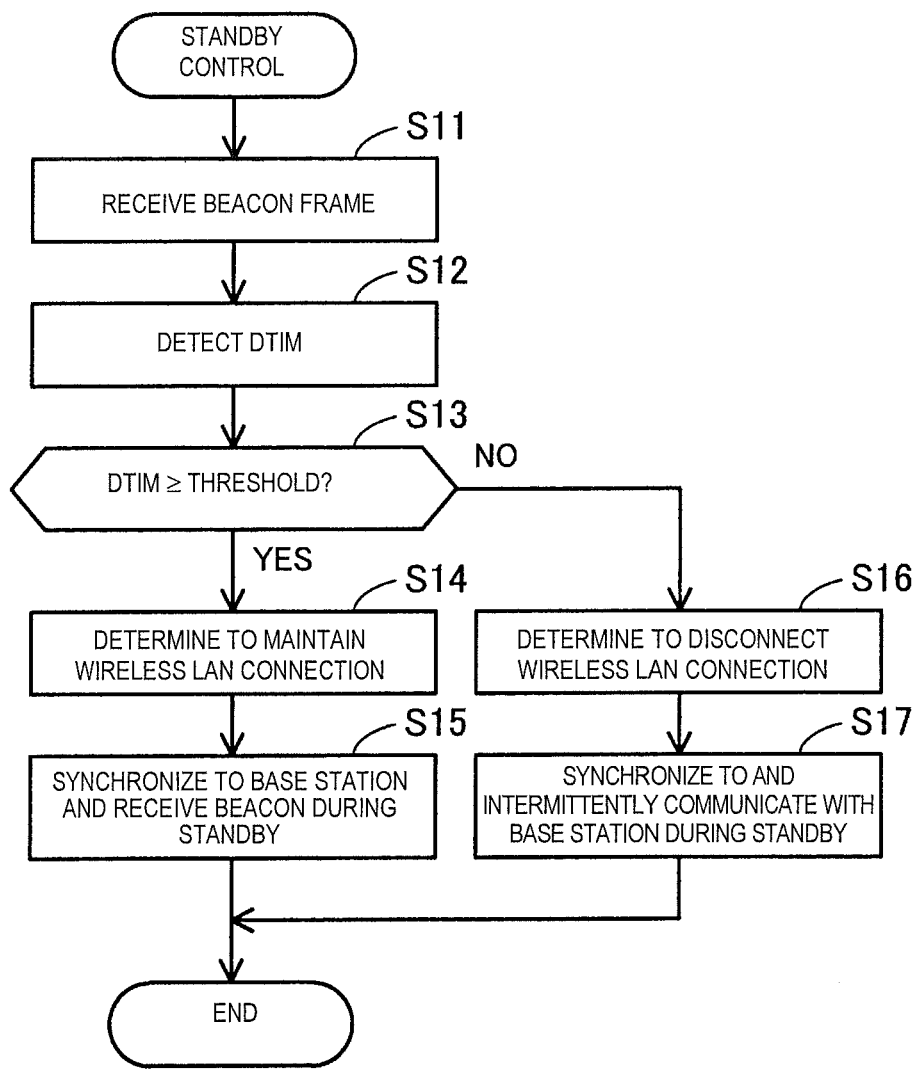
FIG. 10 is a flowchart illustrating standby control according to the second embodiment.

FIG. 10 is a flowchart illustrating standby control according to the second embodiment. The process illustrated in FIG. 10 will be described below in the order of step numbers.

(Step S11) The wireless communication unit 111 connects to a wireless LAN and receives a beacon frame from the access point 210. The wireless communication unit 111 may be transmitter receiver, for example.

(Step S12) The parameter detecting unit 121 detects a DTIM period contained in the beacon frame received at step S11.

(Step S13) The standby selecting unit 122 determines whether or not the value of the DTIM period detected at step S12 is greater than or equal to a DTIM threshold stored in the memory 117. If the value is greater than or equal to the threshold, the process proceeds to step S14; otherwise, the process proceeds to step S16.

(Step S14) The standby selecting unit 122 determines that power consumption will be lower if connection to the wireless LAN is maintained and chooses to keep the wireless communication unit 111 operating during a standby mode.

(Step S15) Once the terminal device 100 has entered standby mode, the wireless communication unit 111 receives a beacon frame from the access point 210 at intervals determined from the DTIM period. The wireless communication unit 112 performs wireless communication with the base station 220 at regular intervals (for example at intervals of 2.56 seconds).

(Step S16) The standby selecting unit 122 determines that power consumption will be lower if connection to the wireless LAN is disconnected and chooses to halt the operation of the wireless communication unit 111 during the standby mode.

(Step S17) Once the terminal device 100 has entered the standby mode, the wireless communication unit 111 stops receiving beacon frames. The wireless communication unit 112 performs wireless communication with the base station 220 at regular intervals. The wireless communication unit 112 also performs Always-ON data communication with the control server 300 at intervals indicated by the interval information (for example, at intervals of 28 minutes).

The terminal device 100 may select reception of a beacon frame by the wireless communication unit 111 or Always-ON data communication by the wireless communication unit 112, whichever consumes less power during the standby mode. When the value of the DTIM period set at the access point 210 to which the terminal device 100 is connected is greater than or equal to a threshold, the terminal device 100 may determine that reception of beacon frames by the wireless communication unit 111 is more advantageous; when the value of the DTIM period is less than the threshold, the terminal device 100 may determine that Always-ON data communication performed by the wireless communication unit 112 is more advantageous. Consequently, power consumption in the terminal device 100 is reduced.

Third Embodiment

A third embodiment will be described below. The following description will focus on differences from the second embodiments and repeated description of elements similar to those of the second embodiment will be omitted. In the third embodiment, it is assumed that different access points of a wireless LAN may send beacons at different intervals. A wireless communication system of the third embodiment may be implemented with a system configuration similar to that of the wireless communication system of the second embodiment illustrated in FIGS. 2 to 4. However, functions implemented by a communication control program of the third embodiment differ from the functions of the second embodiment.

Figure 11:
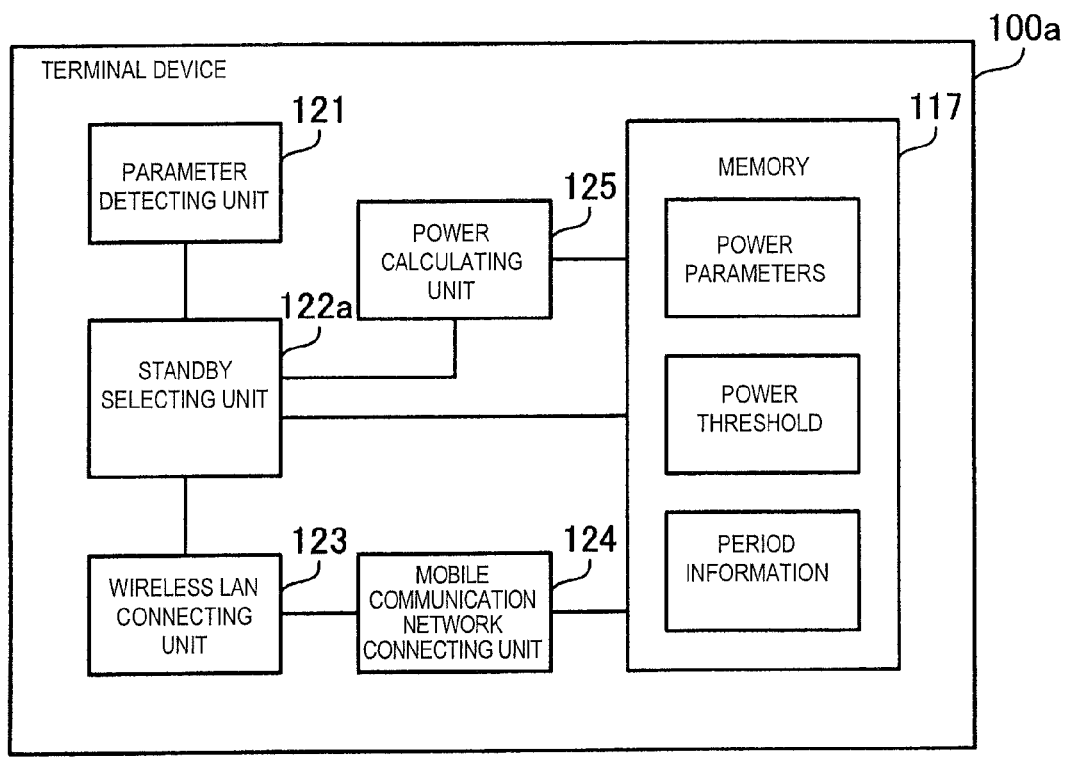
FIG. 11 is a block diagram illustrating functions of a terminal device according to a third embodiment.

FIG. 11 is a block diagram illustrating functions of a terminal device according to the third embodiment. A parameter detecting unit 121, a standby selecting unit 122a, a wireless LAN connecting unit 123, a mobile communication network connecting unit 124, and a power calculating unit 125 are implemented in the terminal device 100a of the third embodiment by a control unit 113 executing a program.

The standby selecting unit 122a reports values of a beacon interval and a DTIM period detected by the parameter detecting unit 121 to the power calculating unit 125. The standby selecting unit 122a then obtains estimated power that will be consumed if connection to the wireless LAN is maintained from the power calculating unit 125 and compares the estimated power consumption with a power threshold stored beforehand in a memory 117. Based on the result of the comparison, the standby selecting unit 122a determines whether or not to maintain connection to the wireless LAN when the terminal device 100a enters a standby mode.

The power calculating unit 125 uses the beacon interval and the DTIM period value reported from the standby selecting unit 122a and power parameters stored beforehand in the memory 117 to calculate estimated power that will be consumed if connection to the wireless LAN is maintained. The power calculating unit 125 returns the calculated estimated power consumption to the standby selecting unit 122a.

Here, the power threshold stored in the memory 117 may be calculated beforehand by a computer other than the terminal device 100a prior to shipment of the terminal device 100a or prior to distribution of the communication control program. The power threshold $I_{Th}$ may be calculated according to Equation (2), for example.

[Equation 2]

$$I_{Th}=(Ia-Ib) \times ta/T+Ib \quad (2)$$

where Ia is power consumption during Always-ON data communication, Ib is the sum of base power for maintaining standby mode and power for synchronization with the base station 220, ta is the duration of data communication performed at a time, and T is intervals. In the example in FIG. 7, Ib=3.28 mA, (Ia−Ib)×ta/T=2.72 mA, and $I_{Th}$=6 mA.

Figure 12:
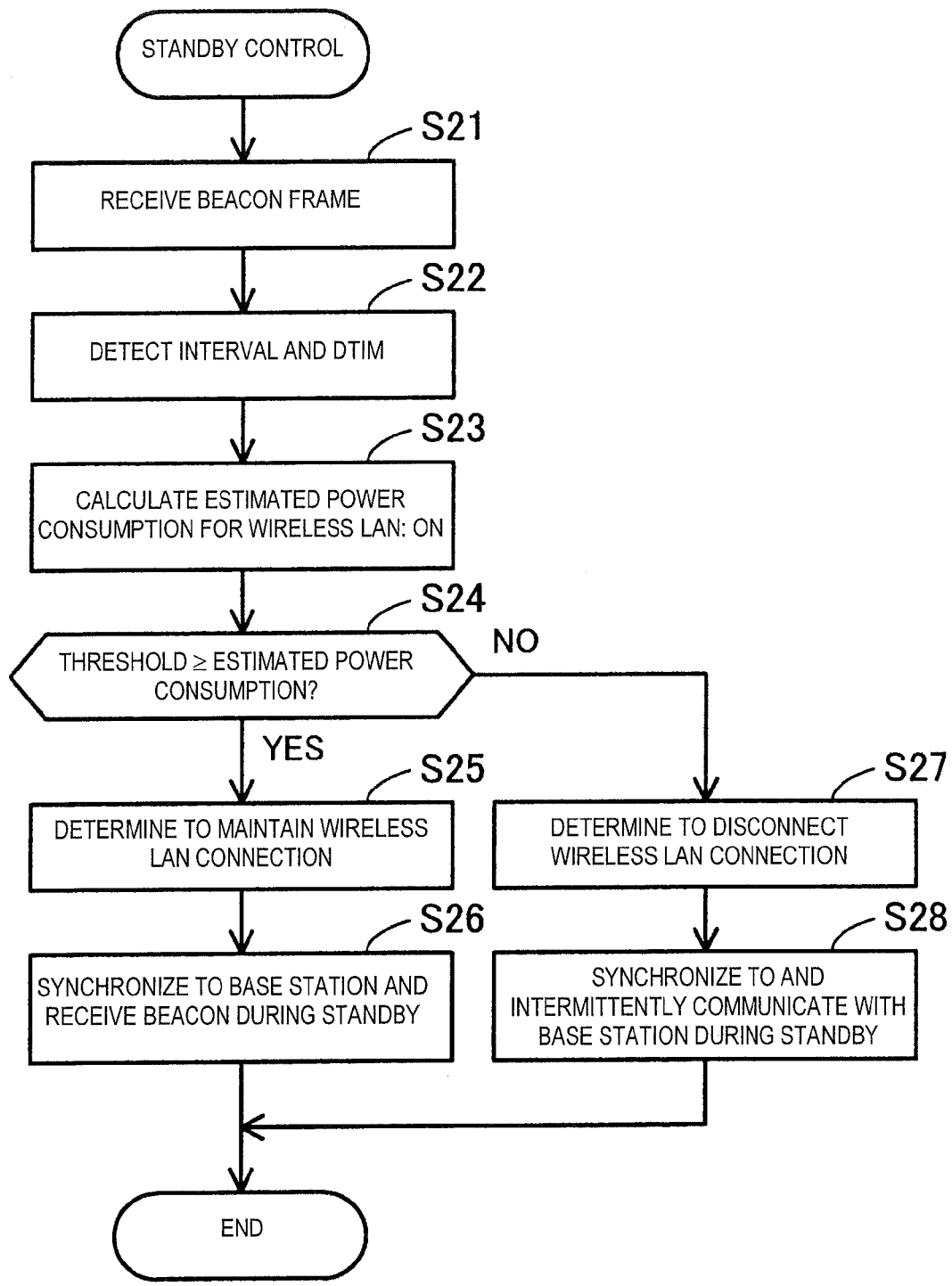
FIG. 12 is a flowchart illustrating standby control according to the third embodiment.

FIG. 12 is a flowchart illustrating standby control according to the third embodiment. The process illustrated in FIG. 12 will be described below in the order of step numbers.

(Step S21) The wireless communication unit 111 connects to a wireless LAN and receives a beacon frame from the access point 210.

(Step S22) The parameter detecting unit 121 detects a beacon interval and a DTIM period contained in the beacon frame received at step S21.

(Step S23) The power calculating unit 125 uses the beacon interval (BI) and the DTIM period detected at step S22 and power parameters stored in the memory 117 to calculate estimated power consumption. The estimated power consumption $I_{ON}$ may be calculated according to Equation (3), for example.

[Equation 3]

$$I_{ON}=Ib+Iw+(Ic/DTIM \times 100/BI) \quad (3)$$

where Ib is the sum of base power for maintaining the standby mode and power for synchronization with the base station 220, Iw is base power of the wireless communication unit 111, Ic is power for receiving beacon frames at beacon intervals of 100 milliseconds and a DTIM period of 1. In the example in FIG. 7, Ib=3.28 mA, Iw=0.66 mA, and Ic=5.06 mA. The power parameters stored in the memory 117 includes Ib, Iw and Ic.

(Step S24) The standby selecting unit 122a determines whether or not the estimated power consumption calculated at step S23 is less than or equal to the power threshold stored in the memory 117. If the estimated power consumption is less than or equal to the threshold, the process proceeds to step S25; otherwise, the process proceeds to step S27.

(Step S25) The standby selecting unit 122a determines that power consumption will be lower if connection to the wireless LAN is maintained and chooses to keep the wireless communication unit 111 operating during a standby mode.

(Step S26) Once the terminal device 100a has entered standby mode, the wireless communication unit 111 receives a beacon frame from the access point 210 at intervals determined by the beacon interval and the DTIM period. The wireless communication unit 112 performs wireless communication with the base station 220 at regular intervals.

(Step S27) The standby selecting unit 122a determines that power consumption will be lower if connection to the wireless LAN is disconnected and chooses to halt operation of the wireless communication unit 111 during the standby mode.

(Step S28) Once the terminal device 100a has entered standby mode, the wireless communication unit 111 stops receiving beacon frames. The wireless communication unit 112 performs wireless communication with the base station 220 at regular intervals. The wireless communication unit 112 also performs data communication with the control server 300 at intervals indicated by interval information.

As in the second embodiment, the terminal device 100a is capable of saving power consumption. Furthermore, the terminal device 100a is capable of selecting a standby method that consumes less power, even if different beacon intervals are set at different access points.

The terminal device 100a in the standby mode may move from the coverage of the wireless LAN while receiving beacon frames. When power of a signal that the terminal device 100a is receiving from the access point 210 decreases and the control unit 113 detects that the terminal device 100a has moved from the coverage of the wireless LAN, the control unit 113 may control the wireless communication unit 112 to start Always-ON data communication after a predetermined period of time has elapsed or immediately after the detection. Because the terminal device 100a starts the Always-ON data communication, the terminal device 100a may maintain the IP address allocated from the mobile communication network 42 and may receive a push message through the mobile communication network 42. The control of switching between the standby methods may be performed by a terminal device 100 of the second embodiment.

Fourth Embodiment

A fourth embodiment will be described below. The following description focuses on differences from the second and third embodiments and repeated description of elements similar to those of the second and third embodiments will be omitted. In the fourth embodiment, a standby method that consumes less power is selected by taking into account the duration of standby mode. A wireless communication system of the fourth embodiment may be implemented with a system configuration similar to that of the wireless communication system of the second embodiment illustrate in FIGS. 2 to 4. However, functions implemented by a communication control program of the fourth embodiment differ from the functions of the second and third embodiments.

Figure 13:
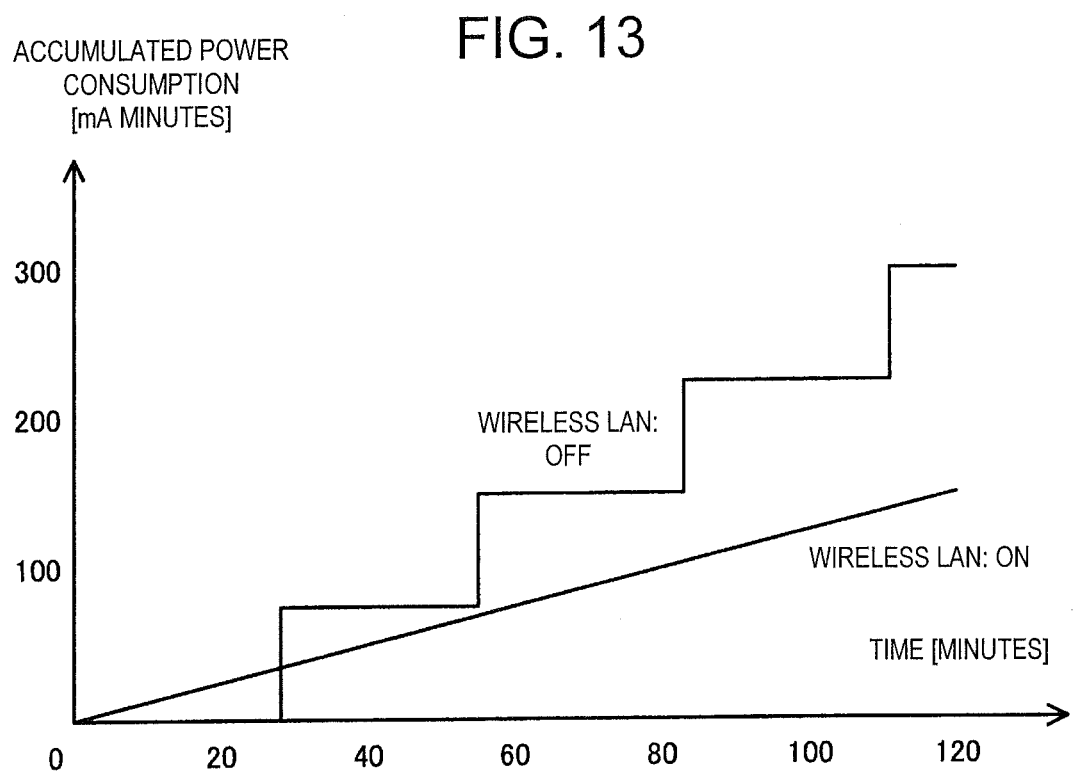
FIG. 13 is a graph illustrating an example of change in accumulated power consumption.

FIG. 13 is a graph illustrating an example of change in accumulated power consumption. The horizontal axis of the graph in FIG. 13 represents time elapsed since a terminal device entered a standby mode and the vertical axis represents accumulated power consumption in the terminal device. The assumption is that Always-ON data communication is performed at intervals of 28 minutes. Base power for maintaining the standby mode and power for maintaining synchronization with a base station are ignored.

As be seen from the graph, accumulated power consumption is proportional to elapsed time in a standby method that maintains connection to a wireless LAN. On the other hand, in a standby method that performs Always-ON data communication, accumulated power consumption increases every 28 minutes. Accordingly, when the standby duration is shorter than 28 minutes, which is the Always-ON data communication intervals, the accumulated power consumption of the latter method is lower than that of the former even if the average power consumption in the former method is lower. Therefore, the standby duration is estimated and a standby method is selected based on the estimated standby duration in the fourth embodiment.

Figure 14:
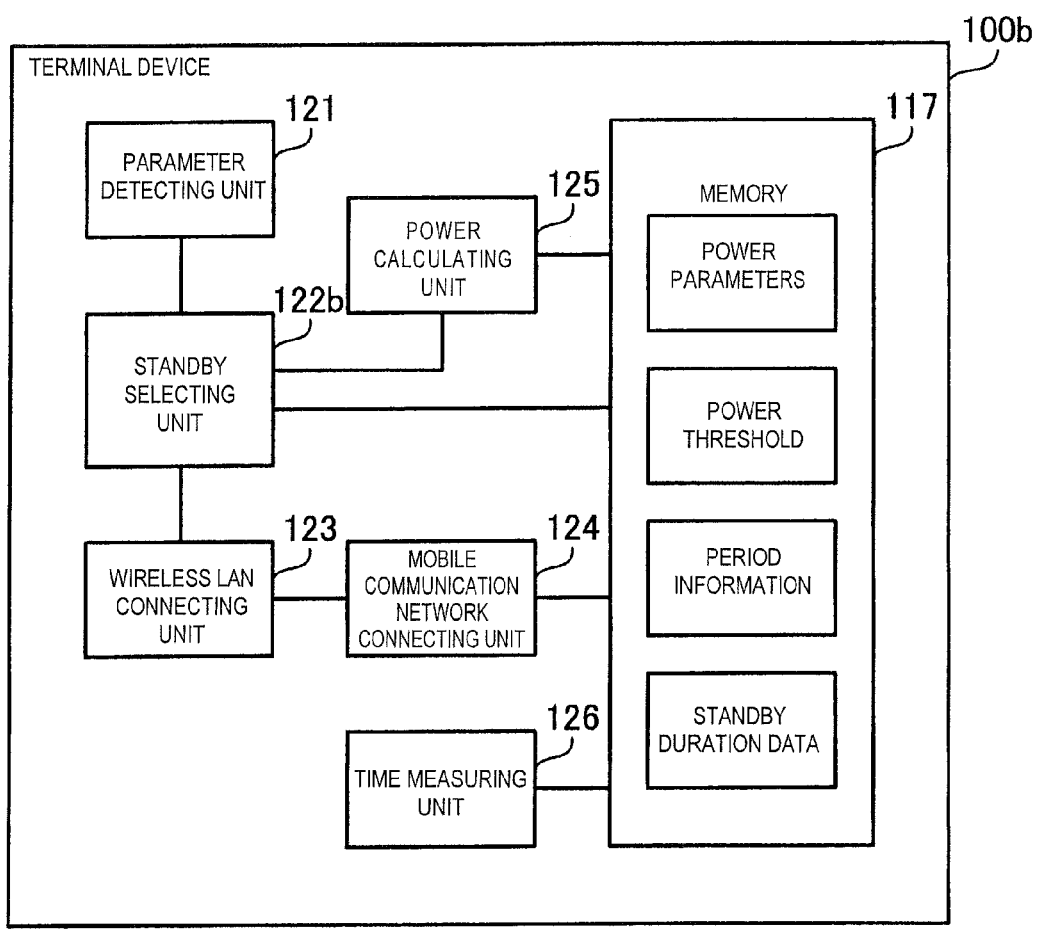
FIG. 14 is a block diagram illustrating functions of a terminal device according to a fourth embodiment.

FIG. 14 is a block diagram illustrating functions of a terminal device according to the fourth embodiment. A parameter detecting unit 121, a standby selecting unit 122b, a wireless LAN connecting unit 123, a mobile communication network connecting unit 124, a power calculating unit 125, and a time measuring unit 126 are implemented in the terminal device 100b of the fourth embodiment by a control unit 113 executing a program.

The standby selecting unit 122b reports values of a beacon interval and a DTIM period detected by the parameter detecting unit 121 to the power calculating unit 125. The standby selecting unit 122b then obtains estimated power that will be consumed if connection to the wireless LAN is maintained from the power calculating unit 125 and compares the estimated power consumption with a power threshold stored beforehand in a memory 117. The standby selecting unit 122b searches standby duration data stored in the memory 117 for an average standby duration associated with the current day of the week and time period. Based on the result of the comparison and the average standby duration, the standby selecting unit 122b determines whether or not to maintain connection to the wireless LAN when the terminal device 100b enters a standby mode.

The time measuring unit 126 detects the timing at which the terminal device 100b entered the standby mode and the timing at which the terminal device 100b exited the standby mode and calculates an actual standby duration. The time measuring unit 126 adds the standby durations thus calculated together and calculates the average standby duration for each day of week and each time period. The time measuring unit 126 then updates the standby duration data stored in the memory 117.

Figures 15, 16:
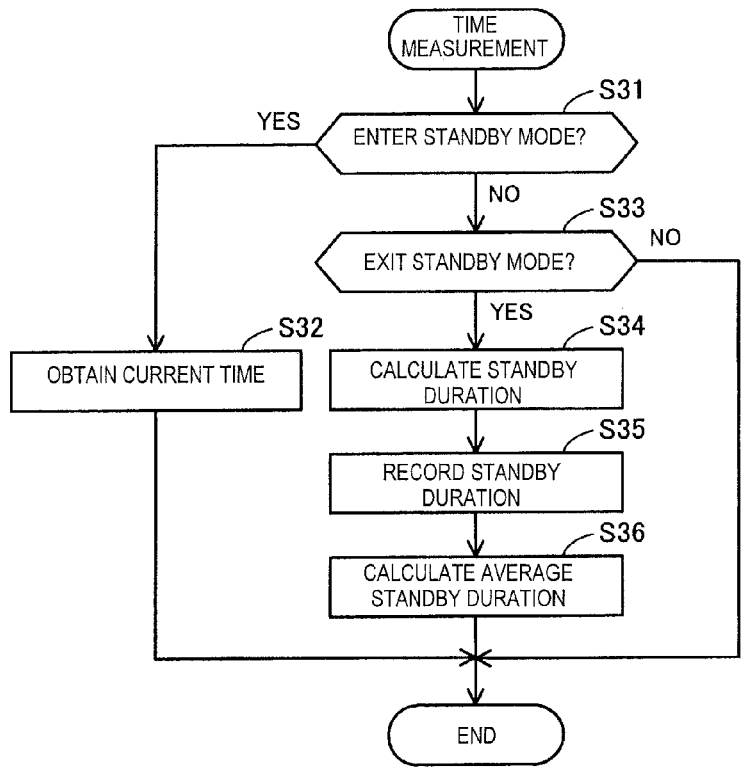
FIG. 15 is a flowchart illustrating time measurement according to the fourth embodiment.
FIG. 16 is a diagram illustrating an exemplary structure of a standby duration table.

FIG. 15 is a flowchart illustrating time measurement according to the fourth embodiment. The process illustrated in FIG. 15 will be described in the order of step numbers.

(Step S31) The time measuring unit 126 determines whether or not the control unit 113 has entered a standby mode to stop execution of an application program. If the measuring unit 126 detects that the control unit 113 has entered standby mode, the process proceeds to step S32; otherwise, the process proceeds to step 33.

(Step S32) When the control unit 113 enters the standby mode, the time measuring unit 126 obtains the current time and stores the current time in the memory 117. Then the process ends.

(Step S33) The time measuring unit 126 determines whether or not the control unit 113 has exited the standby mode and entered an active mode. If the time measuring unit 126 detects that the control unit has entered the active mode, the process proceeds to step S34; otherwise, the process ends.

(Step S34) The time measuring unit 126 obtains the current time and calculates the difference between the current time and the time stored in the memory 117 at step S32 as a standby duration.

(Step S35) The time measuring unit 126 associates the standby duration calculated at step S34 with the current day of the week and the current time period and adds the data to the time duration data stored in the memory 117. The time measuring unit 126 may delete old standby duration data from the memory 117 so that N up-to-date stand durations are registered in the standby duration data (N is an integer greater than or equal to 2).

(Step S36) The time measuring unit 126 obtains past standby duration associated with the current day of the week and the current time period from the standby duration data stored in the memory 117 and calculates the average standby duration for the day of the week and time period. The time measuring unit 126 then updates the average standby duration registered in the standby duration data.

FIG. 16 illustrates an exemplary structure of a standby duration table. A standby duration table as the one illustrated in FIG. 16, for example, is generated and stored in the memory 117 by the time measuring unit 126 as standby duration data. The data structure in FIG. 16 is only illustrative and the structure of standby duration data is not limited to this.

Average durations and durations #1 to #10 are registered in the standby duration table along with days of the week and time periods. Durations #1 to #10 are the latest 10 actual standby duration values calculated for the individual days of the week and time periods. When a new standby duration is registered, the oldest one of the standby durations is deleted. The average duration is the average value of durations #1 to #10.

FIG. 17 is a flowchart illustrating standby control according to the fourth embodiment. The process illustrated in FIG. 17 will be described below in the order of step numbers.

(Step S41) Once connected to a wireless LAN, the wireless communication unit 111 receives a beacon frame from the access point 210.

(Step S42) The parameter detecting unit 121 detects a beacon interval and a DTIM period contained in the beacon frame received at step S41.

(Step S43) The power calculating unit 125 uses the beacon interval and the DTIM period detected at step S42 and power parameters stored in the memory 117 to calculate estimated power consumption. Equation (3) given earlier, for example, may be used for the calculation of the estimated power consumption.

(Step S44) The standby selecting unit 122b determines whether or not the estimated power consumption calculated at step S43 is less than or equal to a power threshold stored in the memory 117. If the estimated power consumption is less than or equal to the threshold, the process proceeds to step S45; otherwise, the process proceeds to step S49.

(Step S45) The standby selecting unit 122b searches the standby duration data stored in the memory 117 for an average standby duration associated with the current day of the week and the current time period.

(Step S46) The Standby selecting unit 122b determines whether or not the average standby duration found at step S45 is longer than the period indicated by interval information (for example 28 minutes). If the average standby duration is longer, the process proceeds to step S47; otherwise, the process proceeds to step S49.

(Step S47) The standby selecting unit 122b determines that power consumption will be lower if connection to the wireless LAN is maintained, and chooses to keep the wireless communication unit 111 operating during a standby mode.

(Step S48) Once the terminal device 100b has entered the standby mode, the wireless communication unit 111 receives a beacon frame from the access point 210 at intervals determined by the beacon interval and the DTIM period. The wireless communication unit 112 performs wireless communication with the base station 220 at regular intervals.

(Step S49) The standby selecting unit 122b determines that power consumption will be lower if connection to the wireless LAN is disconnected, and chooses to halt operation of the wireless communication unit 111 during the standby mode.

(Step S50) When the terminal device 100b enters standby mode, the wireless communication unit 111 stops receiving beacon frames. The wireless communication unit 112 performs wireless communication with the base station 220 at regular intervals. The wireless communication unit 112 also performs data communication with the control server 300 at intervals indicated by interval information.

As in the terminal devices 100 and 100a in the second and third embodiments, the terminal device 100b is capable of saving power consumption. When the standby duration estimated from statistics of past standby durations is short, the terminal device 100b stops receiving beacon frames of the wireless LAN. Thus, power consumption in a short standby is saved. While estimated power consumption calculated from a beacon interval and a DTIM period is compared with a power threshold in the fourth embodiment, a DTIM period may be compared with a DTIM threshold as in the second embodiment.

As stated earlier, the communication control functionality of the terminal devices 100, 100a and 100b may be implemented by computer. In that case, a communication control program that represents processing to be executed by the terminal devices 100, 100a and 100b is provided. The communication control program may be recorded on a computer-readable recording medium (for example the recording medium 323). The recording medium may be a magnetic disk, an optical disk, a magneto-optical disk, or a semiconductor memory, for example. Examples of magnetic disk include hard disks and flexible disks. Examples of optical disc include CD, CD-R (Recordable)/RW (ReWritable), DVD and DVD-R/RW.

To distribute the communication control program, portable media on which the program is recorded are provided. Alternatively, the program may be stored in a storage device of another computer (for example the HDD 313 of a control server) and distributed to the terminal devices 100, 100a and 100b through a network. The terminal devices 100, 100a and 100b may store the program recorded on a portable media or received from another computer into a storage device (for example a memory 117). The terminal devices may then read the program from the storage device and execute the program. Alternatively, the terminal devices may read the program directly from a portable recording medium and execute the program. Alternatively, the terminal devices may execute the program each time the terminal devices receive the program from another program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
   a first wireless communication unit configured to receive a beacon signal when the first wireless communication unit is connected to a first wireless communication network;
   a second wireless communication unit configured to perform data communication through a second wireless communication network only when the first wireless communication unit is not connected to the first wireless communication network; and
   a control unit configured to detect, from a signal from the first wireless communication network, a parameter concerning intervals at which the first wireless communication unit receives the beacon signal, and configured to perform control, based on the detected parameter, as to whether or not to disconnect connection to the first wireless communication network,
   the control unit estimating, from the value of the parameter, power consumed by the first wireless communication unit in receiving the beacon signal and comparing the estimated power consumption with a predetermined threshold to determine whether or not to disconnect connection to the first wireless communication network.

2. The wireless communication device according to claim 1, wherein the control unit records data concerning a period of time during which the wireless communication device has been in a standby mode in the past in a memory and further refers to data stored in the memory to determine whether or not to disconnect connection to the first wireless communication network.

3. The wireless communication device according to claim 2, wherein when an average standby duration indicated by data recorded in the memory is less than or equal to intervals at which the second wireless communication unit performs data communication, the control unit determines to disconnect connection to the first wireless communication network.

4. The wireless communication device according to claim 1, wherein when the control unit detects that the wireless communication device has moved from the coverage of the first wireless communication network after the control unit has determined to maintain connection to the first wireless communication network, the control unit controls the second wireless communication unit to perform data communication.

5. A wireless communication method for a wireless communication device including a first communication unit, a second wireless communication unit and a controller, the wireless communication method comprising:
   detecting a parameter concerning intervals at which the wireless communication device receives a beacon signal from a signal from a first wireless communication network by the controller;
   performing determination based on the parameter as to whether or not to disconnect connection to the first wireless communication network by the controller;
   receiving the beacon signal by the first wireless communication unit if connection to the first wireless communication network is maintained;
   performing, by a processor, data communication through a second wireless communication network by the second wireless communication unit, only if connection to the first wireless communication network is disconnected; and estimating, from the value of the parameter, power consumed by the first wireless communication unit in receiving the beacon signal and comparing the estimated power consumption with a predetermined threshold to determine whether or not to disconnect connection to the first wireless communication network.

6. A non-transitory computer-readable, recording medium storing a communication control program that causes a computer to execute a control method for controlling a wireless communication device including first and second wireless communication units, the control method comprising:

detecting a parameter concerning intervals at which the wireless communication device receives a beacon signal from a signal from a first wireless communication network;

performing determination based on the parameter as to whether or not to disconnect connection to the first wireless communication network;

receiving the beacon signal by the first wireless communication unit constantly, if connection to the first wireless communication network is maintained; and performing data communication through a second wireless communication network by the second wireless communication unit, only if connection to the first wireless communication network is disconnected; and estimating, from the value of the parameter, power consumed by the first wireless communication unit in receiving the beacon signal and comparing the estimated power consumption with a predetermined threshold to determine whether or not to disconnect connection to the first wireless communication network.

* * * * *